Jan. 16, 1945.    B. HEIMBACH    2,367,463
ROTARY BLOWER
Filed March 2, 1940    2 Sheets-Sheet 2

Inventor
Bruno Heimbach
By
Attorney

Patented Jan. 16, 1945

2,367,463

UNITED STATES PATENT OFFICE 2,367,463

ROTARY BLOWER

Bruno Heimbach, Stuttgart, Germany; vested in the Alien Property Custodian

Application March 2, 1940, Serial No. 321,834
In Germany March 18, 1939

4 Claims. (Cl. 230—141)

This invention relates to rotary blowers of the rotary piston type having two oppositely-rotatable interengaging rotors substantially sealed with respect to each other and to the walls of the working cylinder. For best operation under all normal conditions of operation, the end and outer faces of such rotors should have in normal operation as little clearance with the cylinder walls as is possible, but at the same time contact therewith should be avoided particularly on account of the high speeds at which such blowers are sometimes driven.

The primary object of this invention is to provide a rotary blower of this type in which the rotor or rotors may be accurately centered in the working cylinder and maintained during normal operation in free running position therein with minimum clearance. This result is attained in a construction in which normally stationary cylinder heads support the rotor bearings and accurately fit the cylindrical wall of the cylinder. Since these walls should be accurately machined in any event, additional precision is not entailed thereby. In my construction, however, one of these cylinder heads is adjustable axially of the cylindrical wall of the working cylinder, to provide initially upon assembly the proper end clearances for the rotor, by means of a spacing member located between two members rotatable with the rotor in such manner that the spacing member rotates with the rotor free from contact with the adjustable cylinder head, suitable mechanism also being provided for automatically compensating for changes in clearance at the end faces of the rotor or rotors due to temperature variations in the parts under normal conditions of operation of the blower.

Figure 1:
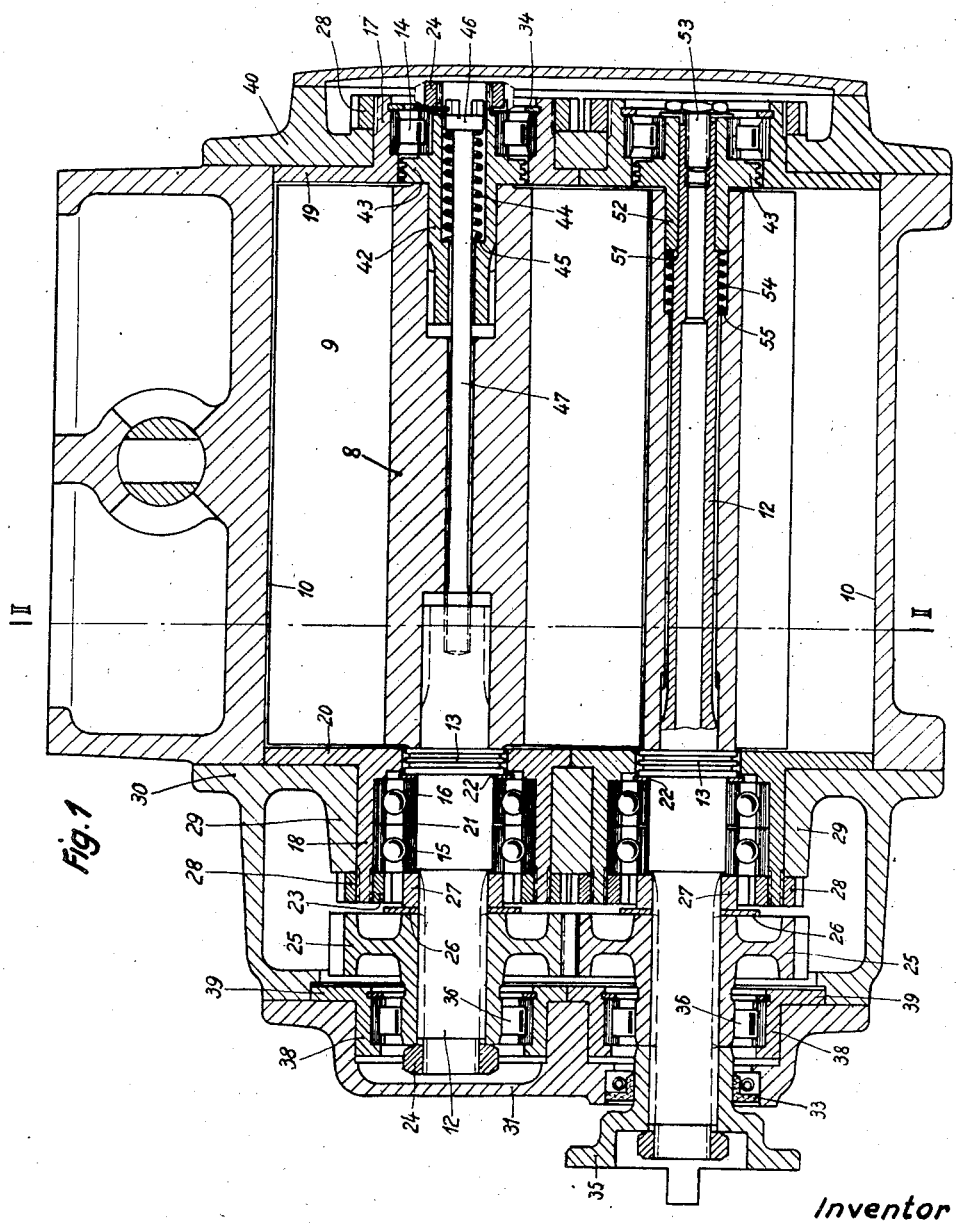
Figure 2:
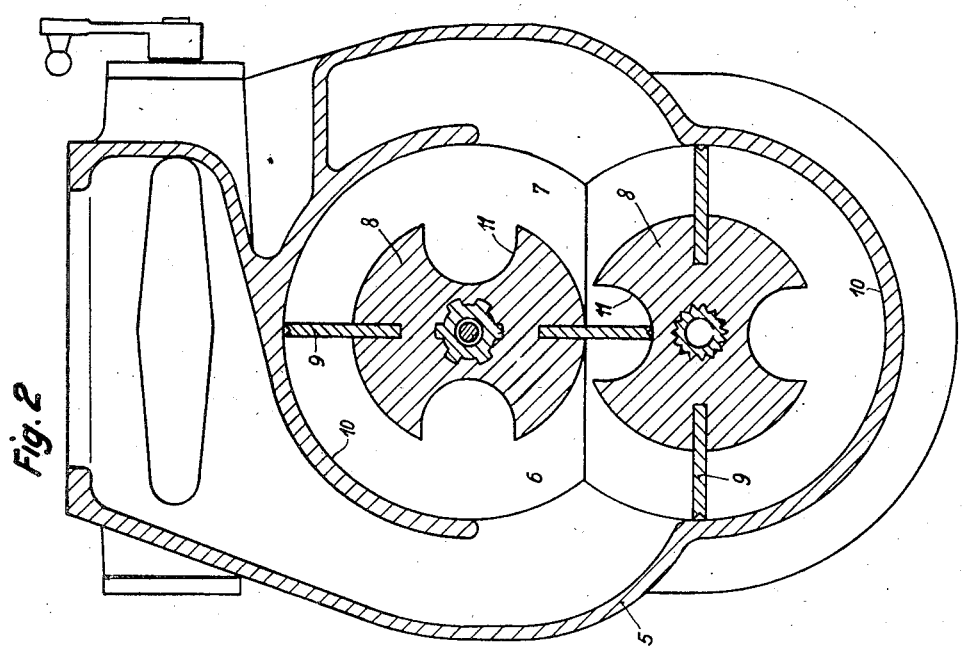

Still other objects of the invention will be apparent from the following description taken in connection with the accompanying drawing illustrating the preferred embodiment. In the drawing, Fig. 1 is a central longitudinal section, partly in elevation, of the blower; and Fig. 2 is a section on line II—II of Fig. 1.

Within the blower casing 5, provided with a suction space 6 and a pressure space 7, are two oppositely rotating rotors 8 each having two vanes 9. These vanes rotate with small clearance in the accurately machined cylindrical walls 10 of the working cylinder 6, 7 and in the grooves 11. To accurately center the rotors 8, the frictionless bearings 14 at one end of each shaft and 15, 16 at the other end, are supported in sleeves 17 and 18, respectively, forming integral parts of the cylinder heads 19 and 20 which accurately fit within the cylinder wall 10. The sheet metal ring 21 between the inner races of the ball bearings 15, 16 of each rotor shaft displaces them to such an extent with respect to the outer races thereof that axial play is eliminated. On each shaft, between the inner race of bearing 16 and the collar 13, which is fixed on or is integral with the shaft and which forms with proper packing material a labyrinth packing around its periphery in the opening in the cylinder head 20, is a washer or shim 22 of such chosen thickness that the clearance between each rotor 8 and the cylinder head 20 may be adjusted to a predetermined small amount. The outer races of the bearings 15, 16 of each rotor shaft are fixed in the sleeve 18 against a shoulder thereof by the exteriorly threaded ring 23, while the nut 24 on the end of the rotor shaft secures the inner races axially on the shaft, the gear 25, keyed on the shaft, together with the washer 26 and ring 27 being interposed. In this way the inner races of the bearings 15, 16 rotate with the rotor shaft, and the washer 22, which initially adjusts the axial position of the cylinder head 20 in the cylinder 10, rotates with its rotor 8 free from contact with its stationary cylinder head and the parts carried by it. By providing the gears 25 with helical teeth, noise is reduced and the angular relation of the two rotors 8 may be adjusted by properly changing the thickness of one of the two washers 26. By means of ring nuts 28, the sleeve 18 is held rigidly in the sleeve 29 of the casing 30 to which is fastened the end cover 31 for enclosing the part as shown.

The lower rotor shaft 12 is longer than the upper shaft and extends through the cover 31, which carries a bearing with an oil seal 33 for the drive coupling 35 fastened by a nut on the end of the shaft. The hub of each gear 25 is journaled in a roller bearing 36 mounted in a bearing member 38 with a flange 39 fitted into a recess of the casing 30 accurately coaxial with the sleeve 29. Each bearing 36 forms a thrust bearing for its shaft and should be accurately positioned coaxially with the other bearings supporting the shaft.

The sleeves 17 supporting the thrust roller bearings 14 of the two rotor shafts are accurately fitted into bores of the casing 40 and secured therein by ring nuts 28, the outer races being fixed by spring rings 34 and the inner races being pressed by nuts 24 against the respective shaft collars 43 forming labyrinth packings, as before, in the openings through the cylinder heads 19. The outer diameter of these collars 43 is somewhat larger than the inner diameter of the outer races of bearings 14, so that by using the customary roller bearings, in which a cage is provided on the inner race, the rotors 8 may be installed and removed with the casing 30 without removing the casing 40. Furthermore, this arrangement permits the transposition of the casing members 30 and 40 with their associated parts, so as to change the drive coupling 35 to the other end if desired. Furthermore, by making the members 30 and 40 coaxial and symmetrical with the casing, they may be turned 180° with respect to the casing to bring the drive coupling 35 above instead of below as shown. Thus the blower may be adapted to different driving conditions, which is especially important in its association with internal combustion engines. This flexibility results from the fact that by omitting the usual methods of construction, requiring dowel pins among other things, the accurately machined cylindrical walls 10 serve for centering the sleeves 17 and 18, and the cylinder heads 19 and 20 are held at a proper distance axially in the casing members 30 and 40. At the same time, the clearance of the end faces of the rotors 8 may be adjusted so accurately that frictional contact with the cylinder heads is avoided and the loss occurring there in operation of the blower is a minimum. Preferably the adjustment of these clearances is effected at the normal operating temperature of the blower.

Inasmuch as the rotor shafts are of metal of high tensile strength as steel, while the rotors 8 and their vanes 9 are preferably of metal expanding linearly at a greater rate upon heating, provision is made to automatically compensate therefor by the following construction. The collar 43 of the upper rotor is provided with a hub 42 which is inserted in the bored end of the rotor. The strong spring 44 reacts at one end against the shoulder 45 of the hub and at the other end against the nut 46 on a tensioning bolt 47 screwed into the rotor shaft. In the case of the lower rotor, the shaft 12 extends through the rotor and has a shoulder 51 against which the hub 52 of the collar 43 is fastened by bolt 53. The strong spring 54 reacts between hub 52 and a shoulder 55 of the rotor 8 which is mounted on shaft 12 so as to be longitudinally movable thereon and to be forced by said spring 54 against the collar 13.

I declare that what I claim is:

1. In a rotary blower of the rotary piston type having two oppositely rotatable interengaging rotors including rotor shafts on which the rotors can slide axially, a rotor chamber comprising a part-cylindrical wall and cylinder heads, one of said cylinder heads comprising a member fixed with respect to the chamber and formed with a sleeve having a bore coaxial with said part-cylindrical wall, said cylinder head further comprising a disk fitting the part-cylindrical wall of the chamber, said disk being formed with a second or inner sleeve slidably fitting the bore of the first or outer sleeve, the bore of the inner sleeve opening through said disk and being concentric with respect to said part-cylindrical wall, an anti-friction bearing on the shaft of one of the rotors within said inner sleeve, said bearing having its inner race fixed on the rotor shaft and its outer race fixed within said inner sleeve, a collar on the rotor shaft, a spacer on the rotor shaft between said collar and the inner race, and rotatable therewith out of contact with said inner sleeve, the thickness of the spacer substantially determining the axial adjustment of the rotor with respect to said disk, adjustable means on the rotor shaft opposing said collar in effective engagement with the inner race of the bearing for locking the rotor in the desired axial position of clearance adjustment relative to the disk afforded by the presence of the said spacer with respect to the adjacent end of the rotor whereby the end of the rotor has the desired clearance with respect to said disk and said rotor including spring means operating in an axial direction between a part of the rotor and the corresponding rotor shaft for automatically maintaining the clearance by compensating for axial expansion and contraction of the rotor due to changes in temperature in the blower.

2. In a rotary blower of the rotary piston type having two oppositely rotatable interengaging rotors including rotor shafts on which the rotors can slide axially; a blower housing comprising a rotor chamber including a part-cylindrical portion for each rotor and cylinder heads on opposite ends of the rotor chamber, one of said cylinder heads comprising a member fixed to the housing and formed with two sleeves through which a portion of the rotor shafts pass, the cylinder head further comprising two disks each closely fitting in one of said part cylindrical portions, each disk being formed with a second or inner sleeve coaxial with the corresponding part cylindrical portion and extending axially through the corresponding one of the first mentioned or outer sleeves and slidably fitting the bore of the outer sleeve, the bores of the inner sleeves opening through the disks and being coaxial with said part cylindrical portions, anti-friction bearings on the rotor shafts with the inner races fixed on the rotor shafts and the outer races fixed in said outer sleeves, a collar on each rotor shaft at one side of the inner race, a spacer on the rotor shaft between the collar and the adjacent side of the inner race of the bearing, the spacer being thereby free to turn with the rotor without contact with the inner sleeve or the disk, and adjustable means on each rotor shaft and opposing the collars on the rotor shafts in effective engagement with the inner races of the bearings for locking the rotors in the desired axial positions of clearance adjustment relative to the said disks afforded by the presence of the said spacers with respect to the adjacent ends of the rotors, said rotors including spring means operating in an axial direction between parts of the rotors and the rotor shafts for automatically maintaining the clearance by compensating for axial expansion and contraction of the rotors due to changes in temperature in the blower.

3. In a rotary blower of the rotary piston type, at least one rotor comprising a shaft and a rotor body which have different linear contraction and expansion resulting from temperature changes, the rotor body being slidable along the shaft, a rotor chamber within which the rotor turns with one end of the rotor in close clearance with respect to at least one end of the chamber and with said shaft fixed against axial displacement in the chamber, and spring means acting between said rotor body and the shaft for moving said rotor body along said shaft in directions toward and away from the said one end of the chamber to automatically maintain the said clearance during temperature changes within the blower.

4. In a rotary blower of the rotary piston type having two oppositely rotatable interengaging rotors, a rotor chamber comprising two cylindrical portions within which the rotors turn, the cylindrical portions having end walls with respect to at least one of which the corresponding ends of the rotors have close clearance, at least one of the rotors comprising a shaft fixed against axial displacement in one of said end walls and a rotor body mounted to slide along said shaft toward and away from the first mentioned end wall, said rotor body and said shaft having different linear contractions and expansions responsive to temperature changes in the blower, and spring means operating between the shaft and the rotor body for automatically moving the rotor body in axial directions to maintain the said clearance during temperature changes in the blower.

BRUNO HEIMBACH.